Dec. 8, 1964   F. TOURTELLOTTE   3,160,865
AUTOMATIC SIGNAL-TRANSLATING APPARATUS
Filed April 1, 1960   3 Sheets-Sheet 1
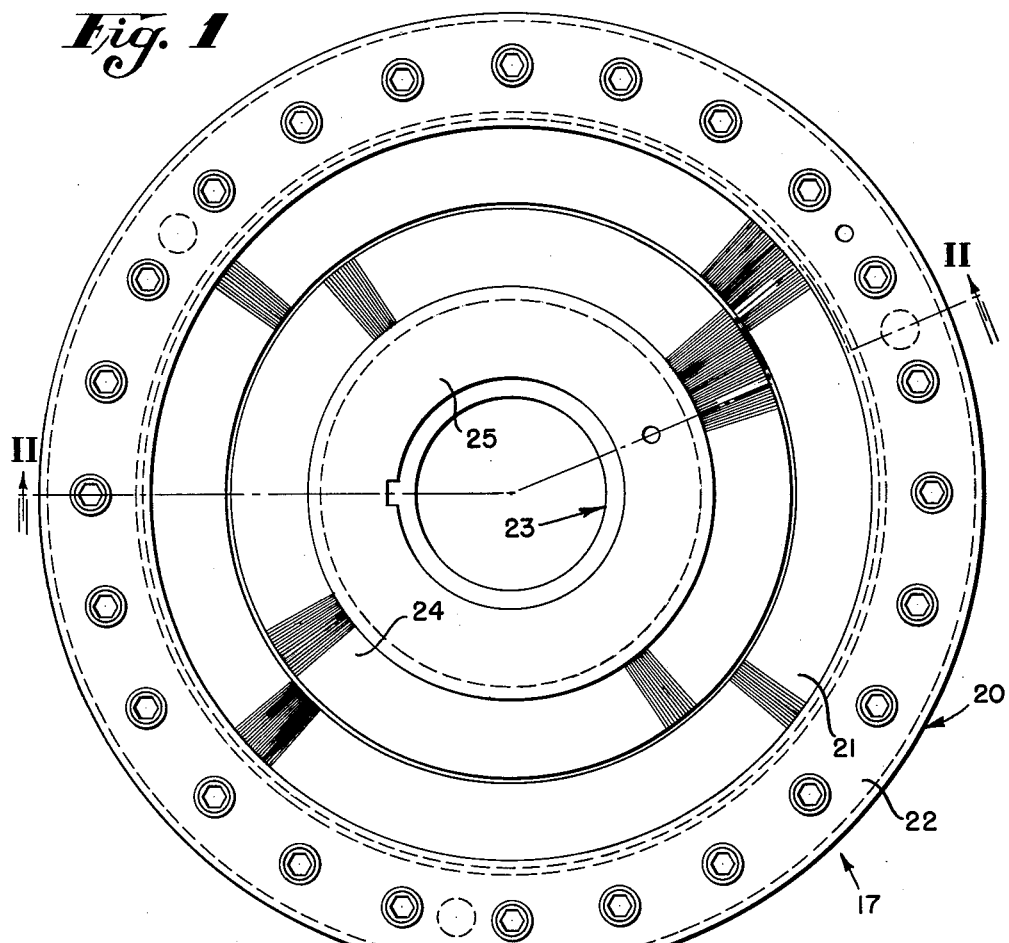
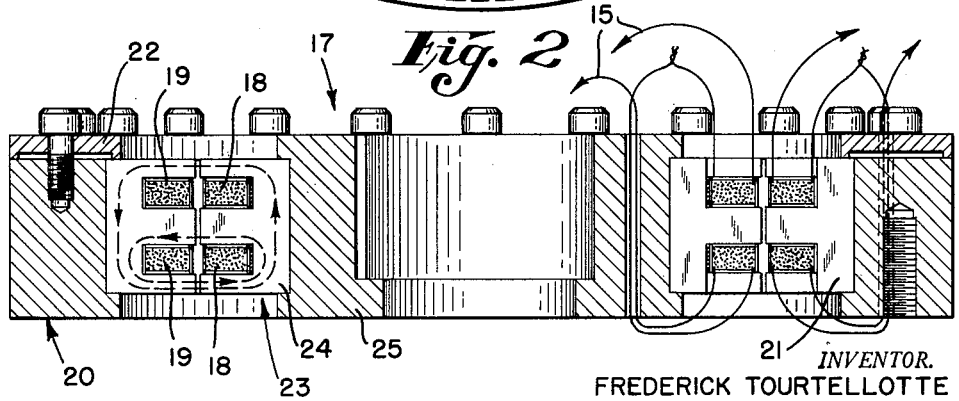
INVENTOR.
FREDERICK TOURTELLOTTE
BY
Charles A. Blank
ATTORNEY.

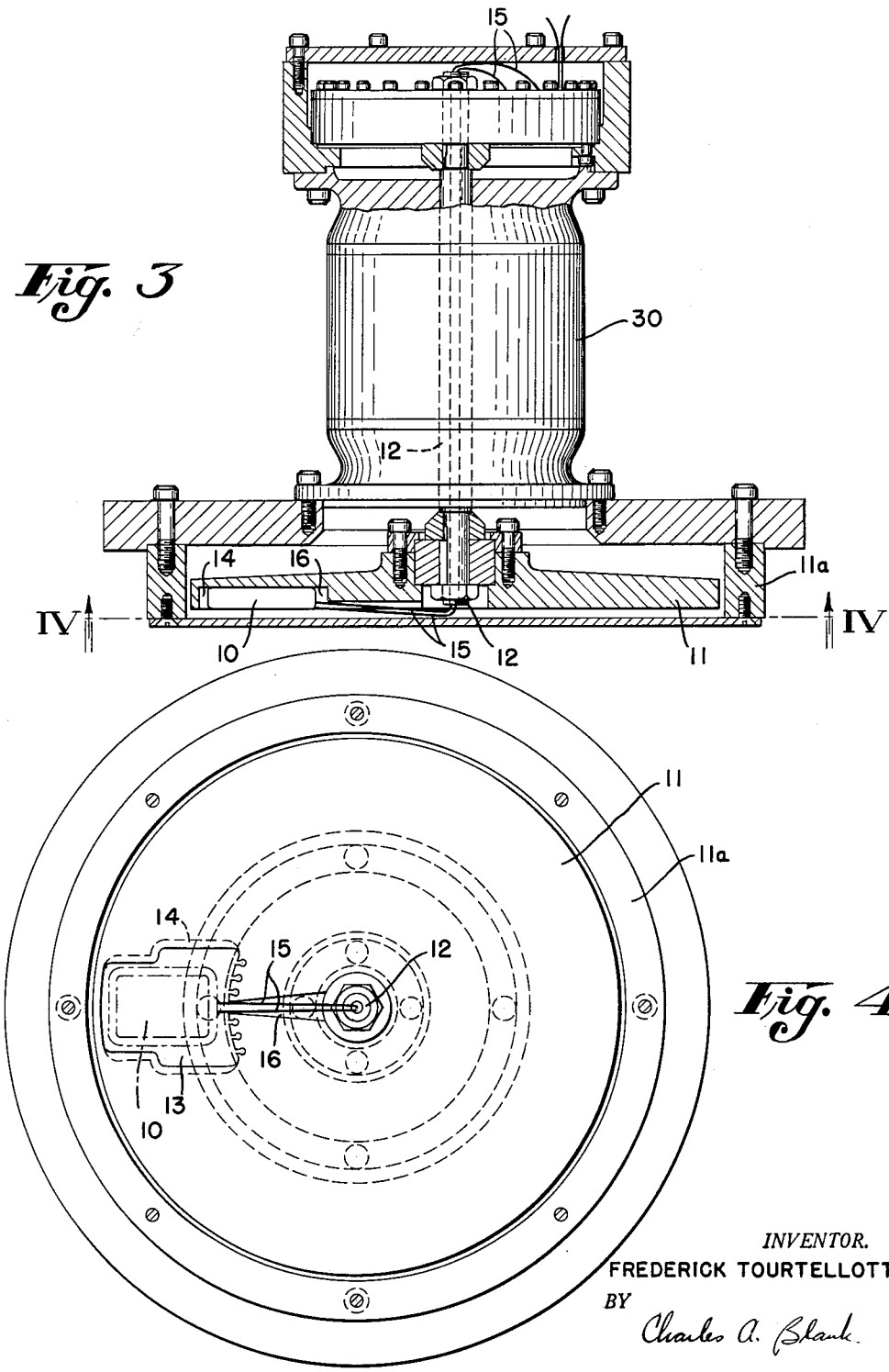

Dec. 8, 1964          F. TOURTELLOTTE          3,160,865
            AUTOMATIC SIGNAL-TRANSLATING APPARATUS
Filed April 1, 1960                         3 Sheets-Sheet 3
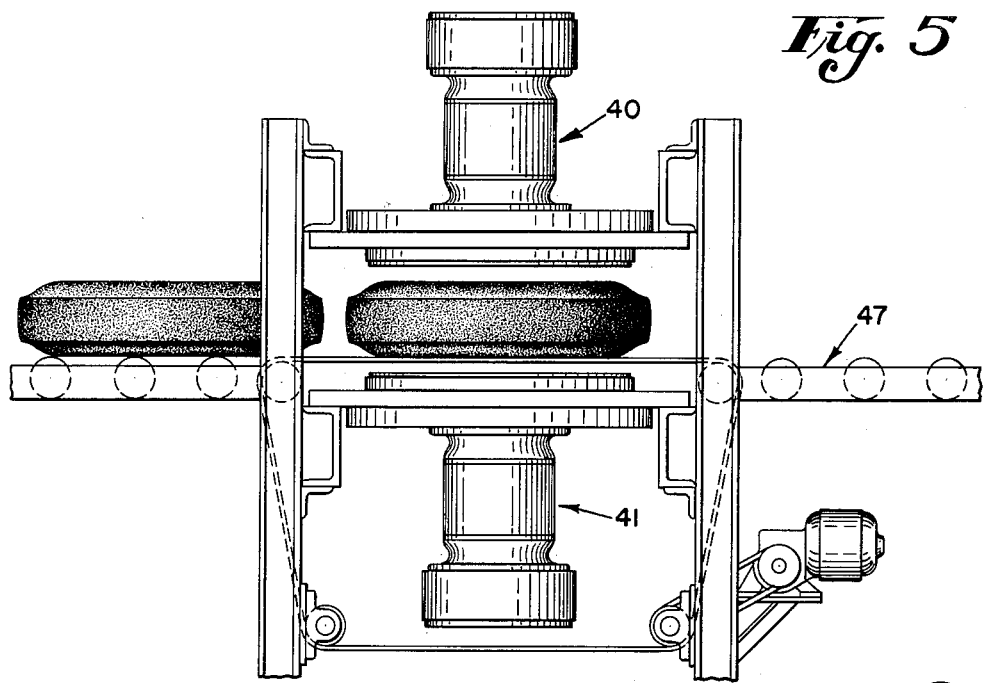
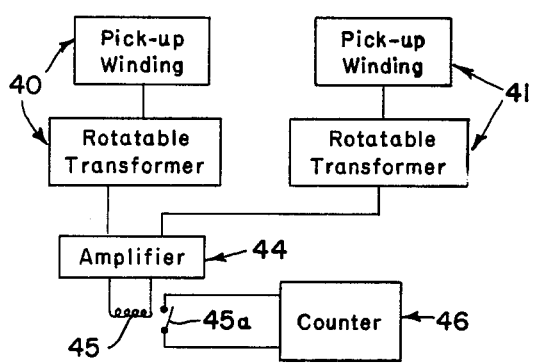
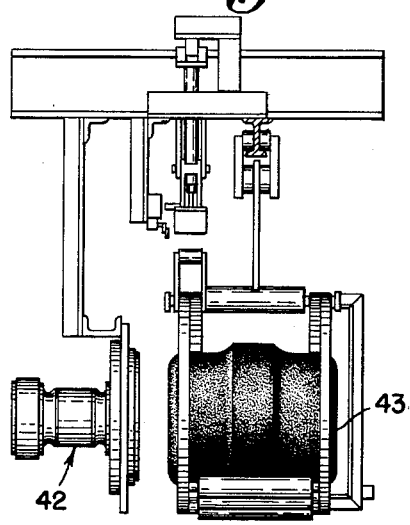
INVENTOR.
FREDERICK TOURTELLOTTE
BY
Charles A. Blank
ATTORNEY.

United States Patent Office 3,160,865
Patented Dec. 8, 1964

3,160,865
AUTOMATIC SIGNAL-TRANSLATING APPARATUS
Frederick Tourtellotte, Royal Oak, Mich., assignor to United States Rubber Company, New York, N.Y., a corporation of New Jersey
Filed Apr. 1, 1960, Ser. No. 19,354
3 Claims. (Cl. 340—174.1)

This invention relates to automatic signal-translating apparatus and, more particularly, to apparatus for identifying tires or the like having magnetically coded bead wires or other structural members.

Tires having magnetically coded bead wires and methods of and apparatus for coding the same have been described and claimed in application Serial No. 779,242, filed December 9, 1958 by Arthur W. Bull, entitled "Method of and Apparatus for Recording Information on a Pneumatic Tire and Product Obtained Thereby, now Patent No. 2,920,674. The present invention relates to improved apparatus capable of detecting and indicating the magnetization of such bead wires.

It is an object of the present invention to provide a new and improved automatic signal-translating apparatus for translating the information on magnetized bead wires of tires.

It is another object of the invention to provide a new and improved apparatus capable of detecting the magnetization of bead wires of tires while the tires are being transported by a conveyor.

It is another object of the invention to provide a new and improved rotatable transformer suitable for use in signal-translating apparatus of the type described.

It is another object of the invention to provide a new and improved rotatable transformer having a simplified mechanical construction and improved electrical characteristics.

In accordance with the invention, automatic signal-translating apparatus responsive to the magnetization of member of a tire or the like comprises magnetic pick-up means rotatable in proximity to the tire member for developing a signal representative of the tire member magnetization. The apparatus includes a transformer comprising a first annulus including an annular core of E-shaped laminations and windings disposed between the arms of the laminations, and means for supporting the laminations, and a second annulus in rotatable relationship to the first annulus including an annular core of E-shaped laminations and windings disposed between the arms of the second annulus. The apparatus also includes means for supporting the laminations of the second annulus. The windings of the second annulus comprise a rotatable primary winding coupled to the pickup means and the windings of the first annulus comprise a stationary secondary winding. The apparatus also includes means for rotating the pick-up means and the first annulus of the transformer to develop in the secondary winding an output signal representative of the tire member magnetization. The apparatus also includes utilizing means responsive to the output signal for developing an effect in accordance with the magnetizaion of the tire member.

For a better understanding of the present invention, together with other and further objects thereof, reference is made to the following description taken in connection with the accompanying drawings, and its scope will be pointed out in the appended claims.

Referring to the drawings:

FIG. 1 is a plan view of a rotatable transformer for use in apparatus constructed in accordance with the invention;

FIG. 2 is a sectional view of the FIG. 1 transformer taken along line II—II of FIG. 1;

FIG. 3 is an elevational view, partly in section, of signal-translating apparatus constructed in accordance with the invention utilizing the FIG. 1 transformer;

FIG. 4 is a view taken along line IV—IV of FIG. 3;

FIG. 5 is an elevational view of signal-translating apparatus constructed in accordance with the invention utilizing two units similar to that represented in FIG. 3;

FIG. 6 is an elevational view representing apparatus similar to the FIG. 3 apparatus mounted for use in identifying raw tire carcasses; and FIG. 7 is a schematic diagram representing electrical circuits of the apparatus.

Referring now more particularly to FIGS. 3 and 4 of the drawings, automatic signal-translating apparatus constructed in accordance with the invention is represented in FIG. 3 in elevational view, partly in section, and in FIG. 4, in sectional view. The apparatus comprises magnetic pick-up means rotatable in proximity to the magnetized element of a tire for developing a signal representative of the magnetization. In particular, the magnetic pick-up means comprises a pick-up winding 10 mounted in a non-magnetic disc 11 in a non-magnetic housing 11a and rotatable about central hollow shaft 12. The disc 11 and its housing 11a preferably are made of aluminum. The winding 10 is spaced from the shaft 12 by a distance approximately equal to the radius of a tire bead wire. The pick-up winding 10 preferably comprises 2400 turns of copper wire mounted in a plastic insulating binder 13 poistioned within an irregularly shaped cavity 14 in aluminum disc 11. The irregular shape of the cavity 14 provides a gripping surface for the plastic binder. Lead wires 15 from the pick-up winding 10 pass through slot 16 and hollow shaft 12 to the primary winding of a rotatable transformer presently to be described.

Referring now to FIGS. 1 and 2, the apparatus includes a transformer 17 having a rotatable primary winding coupled to the pick-up means and having a stationary secondary winding. The transformer 17 preferably has a wide frequency-response characteristic extending from 10 cycles to 15 kilocycles, flat to within ±1 decibel. To this end, the transformer comprises an outer annulus 20 including an annular core of E-shaped laminations 21 with the windings 19 disposed between the arms of the laminations and preferably connected in series-aiding relation to form a secondary winding. An outer clamp 22 is utilized to bend the backs of the laminations and thus maintain them in a substantially radial disposition. The laminations preferably have grain orientation in the direction of the arms of the E laminations to minimize the magnetic reluctance and to extend the frequency-response characteristic of the transformer, as will be more fully explained subsequently.

The transformer also includes an inner annulus 23 in rotatable relationship with the outer annulus 20 and including an annular core 24 of E-shaped laminations having windings 18 preferably connected in series-aiding relation to form a primary winding disposed between the arms of the laminations for binding the laminations together on a mounting ring 25 keyed to shaft 12 and for reducing flux leakage. The laminations of the inner annulus are also grain-oriented in the direction of the arms of the end of the E to extend the frequency-response characteristic of the transformer.

A "grain-oriented" material is a magnetic material which has better magnetic properties along one of its axes than along its other two axes. Thin lamination stock can usually be grain-oriented by cold milling and special annealing after the laminations have been stamped. If in an E lamination the grain orientation is formed in the direction of the arms of the E, the magnetic flux will encounter less reluctance in traveling parallel to the arms of the E than in crossing the width of an arm or in crossing the back of the E. This effect is utilized in the transformer to direct the flux to and across the air gap to aid in reducing the reluctance of the magnetic path and in reducing flux leakage. Also, the E laminations provide two parallel flux paths, represented diagrammatically in broken line in FIG. 2, for each portion of the winding effectively to reduce the reluctance of the air gap and to provide a close coupling between primary and secondary windings by reducing magnetic leakage. The low-frequency response of the transformer is thereby extended. Because E laminations are utilized in the transformer, both the primary and secondary windings are divided between the arms of the E. Dividing the windings reduces the capacitance between turns in each winding with the effect of extending the high-frequency response of the transformer. Also, the radial disposition of the E laminations normal to the conductors of the windings minimizes the induced currents flowing in the liminations to extend the high-frequency response of the transformer.

Referring again to FIG. 3, the signal-translating apparatus also includes means comprising a motor 30 for rotating the central shaft 12, the disc 11 and the pickup coil 10 and the primary winding of the transformer 17 to develop in the secondary winding 19 an output signal representative of the bead wire magnetization.

The apparatus also includes utilizing means responsive to the output signal for developing an effect in accordance with the magnetization of the bead wire. The utilizing means may for example, be a counter mechanism of conventional construction, an indicating light, or a tire-sorting mechanism of conventional construction.

Considering now the operation of the apparatus with reference to FIGS. 5, 6 and 7, two units such as the units 40 and 41, similar to the unit 17 of FIG. 1, may be positioned with respect to a tire conveyor as indicated in FIG. 5 to detect the magnetization of either bead wire of the tire. The conveyor 47 may transport tires at the rate of, for example, 60 tires per minute. Unit 42, similar to the unit 17 of FIG. 1, may be utilized as a single unit and may be positioned as indicated in FIG. 6 with reference to a conventional conveyor for tire carcasses to detect the magnetization of the bead wire of a carcass 43. It will be assumed for clarity of explanation that tires having magnetized bead wires are to be counted, and that the magnetization of a bead wire is in the form of a single magnetized 1 inch length of the bead wire. Referring again to FIGS. 5 and 7, the motors of the units 40 and 41 may be energized continuously to rotate the pick-up windings in proximity to the tire bead wires and to develop a signal of, for example, 10 millivolts amplitude which is translated through either pick-up winding and rotatable transformer to an amplifier 44, A.C. relay 45 and utilizing device, such as a counter 46 of conventional construction. If either bead wire of the tire is magnetized, a 60 cycle signal is developed when the pick-up winding is rotated at 3600 revolutions per minute. This signal is translated through the electrical circuits represented diagrammatically in FIG. 7 to energize the A.C. relay while the magnetized bead wire is in proximity to the pick-up winding, activating the counter when the relay contacts 45a close.

It should be understood that the apparatus of FIGS. 5 and 6 is capable of translating multiple pulse signals of varying length and spacing, which may have been coded to represent information relating to the manufacture of the tires and which may thereafter be decoded by suitable circuits.

In connection with the rotatable transformer, that transformer is capable of translating signals of frequencies as high as 15 kilocycles because of the unique design features of the transformer mentioned previously, thereby enabling the transformer to translate pulse coded signals. While applicant does not wish to be limited to any particular set of circuit constants and other parameters, the following represents a preferred design of a transformer for use in an embodiment of the invention:

Primary winding:
    Number of turns _____ 1200 (each coil).
    Wire size _____ #30.
    D.C. resistance _____ 101.5Ω (each coil).
    Inductance at 1000 cycles (coils connected series-aiding):
        Secondary open _____ 9.23 henry.
        Secondary shorted ___ 3.27 henry.
Secondary winding:
    Number of turns _____ 190 (each coil).
    Wire size _____ #22.
    D.C. resistance _____ 5.72 ohms (each coil).
Primary to secondary ratio of transformation _____ 6.315:1.
Normal load resistance _____ 10,000 ohms.
Normal signal generator resistance (pick-up coil) ____ 2,400 ohms.

From the foregoing description it will be apparent that automatic signal-translating apparatus constructed in accordance with the invention has the advantage of being an integral unit which can be readily mounted in proximity to a conveyor line of tires and is capable of detecting and indicating the magnetization of bead wires of the tires. Moreover, a rotatable transformer constructed in accordance with the invention has the advantage of having improved electrical characteristics while being of simplified construction, utilizing standard E laminations arranged radially in such a manner that the individual laminations of the outer annulus are self-anchored in a clamping ring.

While there have been described what are presently believed to be preferred embodiments of the invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. Automatic signal-translating apparatus responsive to the magnetization of a bead wire of a tire or the like comprising: a central shaft; non-magnetic means rotatable about said central shaft; a magnetic pick-up winding mounted on said non-magnetic means at a distance from said central shaft approximately equal to the radius of the bead wire of a tire and rotatable in proximity to the bead wire for developing a signal representative of the bead wire magnetization; a transformer comprising a first annulus including an annular core of E-shaped laminations and windings disposed between the arms of the laminations, and means for supporting said laminations, and a second annulus in rotatable relationship to said first annulus including an annular core of E-shaped laminations and windings disposed between the arms of said second annulus, said windings of said second annulus comprising a rotatable primary winding coupled to said pick-up winding and said windings of said first annulus comprising a stationary secondary winding; means for rotating said central shaft to rotate said pick-up winding and said primary winding to develop an output signal in said secondary winding representative of the magnetization of the bead wire; and utilizing means responsive to said output signal for developing an effect in accordance with the magnetization of the bead wire.

2. Automatic signal-translating apparatus responsive to the magnetization of a member of a tire or the like comprising: magnetic pick-up means rotatable in proximity to the tire member for developing a signal representative of the tire member magnetization; a transformer comprising a first annulus including an annular core of E-shaped laminations and windings disposed between the arms of the laminations and means for supporting said laminations, and a second annulus in rotatable relationship to said first annulus including an annular core of E-shaped laminations and windings disposed between the arms of said laminations of said second annulus and means for supporting said laminations of said second annulus, said windings of said second annulus comprising a rotatable primary winding coupled to said pick-up means and said windings of said first annulus comprising a stationary secondary winding; means for rotating said pickup means and said second annulus of said transformer to develop an output signal in said secondary winding representative of the tire member magnetization; and utilizing means responsive to said output signal for developing an effect in accordance with the magnetization of the tire member.

3. Automatic signal-translating apparatus responsive to the magnetization of a bead wire of a tire or the like comprising: a central shaft; a non-magnetic disc rotatable about said central shaft; a magnetic pickup winding mounted in said non-magnetic disc at a distance from said central shaft approximately equal to the radius of the bead wire of a tire and rotatable in proximity to the bead wire for developing a signal representative of the bead wire magnetization; a transformer comprising an outer annulus including an annular core of E-shaped laminations and windings disposed between the arms of said laminations and an outer clamp for supporting said laminations, and an inner annulus in rotatable relationship to said outer annulus including an annular core of E-shaped laminations and windings disposed between the arms of said laminations of said inner annulus for binding together said laminations of said inner annulus, said windings of said inner annulus comprising a rotatable primary winding coupled to said pick-up winding and said outer windings comprising a stationary secondary winding; means for rotating said pick-up winding and said inner annulus of said transformer at a frequency of the order of 3600 revolutions per minute to develop in said secondary winding an output signal respresentative of the bead wire magnetization; and circuit means coupled to said secondary winding for developing a control signal in accordance with the magnetization of the bead wire.

References Cited in the file of this patent

UNITED STATES PATENTS

| | | |
|---|---|---|
| 2,402,603 | Clark | June 25, 1946 |
| 2,432,982 | Braddon | Dec. 23, 1947 |
| 2,611,813 | Sharpless et al. | Sept. 23, 1952 |
| 2,648,589 | Hickman | Aug. 11, 1953 |
| 2,737,646 | Muffly | Mar. 6, 1956 |
| 2,750,579 | Lekas et al. | June 12, 1956 |
| 2,770,796 | Boer | Nov. 13, 1956 |
| 2,856,462 | Lyon | Oct. 14, 1958 |
| 2,894,231 | Krasno | July 7, 1959 |
| 2,899,260 | Tarrand et al. | Aug. 11, 1959 |
| 2,914,746 | James | Nov. 24, 1959 |
| 2,920,674 | Bull | Jan. 12, 1960 |
| 2,952,010 | Demer et al. | Sept. 6, 1960 |